(12) United States Patent
Depraete (10) Patent No.: US 10,030,753 B2
(45) Date of Patent: Jul. 24, 2018

(54) HYDROKINETIC TORQUE COUPLING DEVICE FOR A MOTOR VEHICLE

(71) Applicant: VALEO EMBRAYAGES, Amiens (FR)

(72) Inventor: Alexandre Depraete, Bloomfield, MI (US)

(73) Assignee: Valeo Embrayages, Amiens (FR)

( * ) Notice: Subject to any disclaimer, the term of this patent is extended or adjusted under 35 U.S.C. 154(b) by 103 days.

(21) Appl. No.: 14/873,318

(22) Filed: Oct. 2, 2015

(65) Prior Publication Data
US 2017/0097076 A1 Apr. 6, 2017

(51) Int. Cl.
*F16H 45/02* (2006.01)
*F16D 25/06* (2006.01)
*F16F 15/133* (2006.01)

(52) U.S. Cl.
CPC ............. *F16H 45/02* (2013.01); *F16D 25/06* (2013.01); *F16F 15/1333* (2013.01); *F16F 2230/0064* (2013.01); *F16H 2045/0221* (2013.01); *F16H 2045/0247* (2013.01); *F16H 2045/0278* (2013.01)

(58) Field of Classification Search
CPC .......................... F16H 2045/0221; F16H 45/02
See application file for complete search history.

(56) References Cited

U.S. PATENT DOCUMENTS

| 2,551,718 | A | | 5/1951 | Auten | |
|---|---|---|---|---|---|
| 4,145,936 | A | | 3/1979 | Vincent et al. | |
| 5,477,950 | A | * | 12/1995 | Maloof | F16D 25/0635 192/3.29 |
| 5,697,261 | A | | 12/1997 | Mokdad et al. | |
| 5,893,355 | A | | 4/1999 | Glover et al. | |
| 6,585,091 | B2 | | 7/2003 | Reinhart et al. | |
| 2003/0106763 | A1 | | 6/2003 | Kimura et al. | |
| 2015/0260270 | A1 | * | 9/2015 | Kwon | F16H 45/02 192/3.28 |
| 2015/0369296 | A1 | | 12/2015 | Lopez-Perez | |
| 2015/0377320 | A1 | * | 12/2015 | Miyahara | F16F 15/145 188/378 |

FOREIGN PATENT DOCUMENTS

| DE | 19729421 A1 | 1/1998 |
|---|---|---|
| DE | 19919449 A1 | 11/1999 |

(Continued)

*Primary Examiner* — Ramya P Burgess
*Assistant Examiner* — Lillian T Nguyen
(74) *Attorney, Agent, or Firm* — Berenato & White, LLC (57) ABSTRACT

The invention relates to a hydrokinetic torque coupling device for a motor vehicle, comprising a torque input element (11) intended to be coupled to a crankshaft (1), an impeller wheel (3) rotationally coupled to the torque input element (11) and able to hydrokinetically drive a turbine wheel (4), a torque output element (8) intended to be coupled to a transmission input shaft (2), clutch means (10) movable between an engaged position wherein the torque input element (11) and the torque output element (8) are rotationally coupled through damping means (23, 27), and a disengaged position wherein the torque input element (11) and the torque output element (8) are rotationally coupled through the impeller wheel (3), the turbine wheel and the damping means (23, 27).

21 Claims, 8 Drawing Sheets

(56) References Cited

FOREIGN PATENT DOCUMENTS

| | | |
|---|---:|---|
| DE | 10017801 A1 | 10/2001 |
| DE | 102004024747 A1 | 12/2005 |
| EP | 1048420 A2 | 11/2000 |
| FR | 2493446 A1 | 5/1982 |
| FR | 2628804 A1 | 9/1989 |
| FR | 2714435 A1 | 6/1995 |
| FR | 2828543 A1 | 2/2003 |
| FR | 2938030 A1 | 5/2010 |
| GB | 1212042 A | 11/1970 |
| GB | 2235749 A | 3/1991 |
| GB | 2262795 A | 6/1993 |
| GB | 2283558 A | 5/1995 |
| GB | 2284875 A | 6/1995 |
| GB | 2468030 A | 8/2010 |
| JP | 09280317 A | 10/1997 |
| JP | 2011047462 A | 3/2011 |
| WO | WO9914114 A1 | 3/1999 |
| WO | WO2004016968 A1 | 2/2004 |
| WO | WO2011006264 A1 | 1/2011 |
| WO | WO2014128380 A1 | 8/2014 |

\* cited by examiner

Fig. 9

HYDROKINETIC TORQUE COUPLING DEVICE FOR A MOTOR VEHICLE

FIELD OF THE INVENTION

The present invention relates to a hydrokinetic torque coupling device for a motor vehicle, such as a torque converter, for instance.

BACKGROUND OF THE INVENTION

Figure 1:
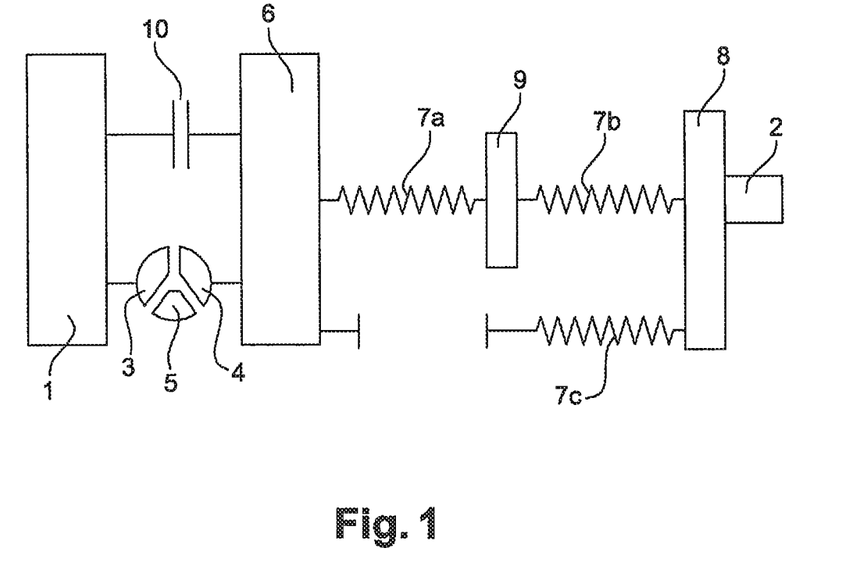
FIG. 1 is a schematic representation of a torque converter of the prior art.

A known hydrodynamic torque converter is schematically and partially illustrated in FIG. 1 and makes it possible to transmit a torque from the output shaft of an internal combustion engine in a motor vehicle, such as for instance a crankshaft 1, to a transmission input shaft 2.

The torque converter conventionally comprises an impeller wheel 3, able to hydrokinetically drive a turbine wheel 4 through a reactor 5.

The impeller wheel 3 is coupled to the crankshaft 1 and the turbine wheel 4 is coupled to guiding washers 6.

A first group of elastic members 7a, 7b of the compression spring type is mounted between the guiding washers 6 and a central hub 8 coupled to the transmission input shaft 2. The elastic members 7a, 7b of the first group are arranged in series through a phasing member 9, so that said elastic members 7a, 7b are deformed in phase with each other, with said phasing member 9 being movable relative to the guiding washers 6 and relative to the hub 8.

A second group of elastic members 7c is mounted with some clearance between the guiding washers 6 and the central hub 8 in parallel with the first group of elastic members 7a, 7b, with said elastic members 7c being adapted to be active on a limited angular range, more particularly at the end of the angular travel of the guiding washers 6 relative to the central hub 8. The angular travel, or the angular shift noted α, of the guiding washers 6 relative to the hub 8, is defined relative to a rest position (α=0) wherein no torque is transmitted through damping means formed by the above-mentioned elastic members 7a, 7b.

The torque converter further comprises clutch means 10 adapted to transmit a torque from the crankshaft 1 to the guiding washers 6 in a determined operation phase, without any action from the impeller wheel 3 and the turbine wheel 4.

The second group of elastic members 7c makes it possible to increase the stiffness of the damping means at the end of the angular travel, i.e. for a significant a angular offset of the guiding washers 6 relative to the hub 8 (or vice versa).

It can be seen that the representation of function M=f(α) which defines the M torque transmitted though the device according to the a angular shift, comprises a first linear portion of slope Ka (for the low values of the a angular shift) and a second, more important, linear portion of slope Kb (for the high value of the a angular shift). Ka and Kb are the angular stiffness of the device, at the beginning and at the end of the angular travel respectively. If K1 defines the cumulated stiffness of the first springs of each pair of the first group, and K2 defines the cumulated stiffness of the second springs of each pair of the first group, and K3 defines the cumulated stiffness of the springs of the second group, then Ka=(K1·K2)/(K1+K2) and Kb=Ka+K3.

The break of slope between the first and second portions of the curve may generate vibrations and a significant hysteresis upon operation of the torque converter which might affect the quality of filtration obtained using the damping means.

SUMMARY OF THE INVENTION

The invention more particularly aims at providing a simple, efficient and cost-effective solution to this problem.

For this purpose, it provides for a hydrokinetic torque coupling device for a motor vehicle, comprising
a torque input element intended to be coupled to a crankshaft,
a turbine wheel,
an impeller wheel rotationally coupled to the torque input element and able to hydrokinetically drive a turbine wheel,
a torque output element intended to be coupled to a transmission input shaft,
damping means,
clutch means movable between an engaged position wherein the torque input element and the torque output element are rotationally coupled through the damping means, and a disengaged position wherein the torque input element and the torque output element are rotationally coupled through the impeller wheel, the turbine wheel and the damping means, with the damping means, being adapted to act against the rotation of the torque input element relative to the torque output element, with the damping means comprising an elastic blade elastically supported by a supporting member, with said elastic blade being able to bend upon rotation of the torque input element relative to the torque output element in an engaged position, with the hydrokinetic torque coupling device further comprising a single flange connecting the turbine wheel, on the one hand, and the supporting member or the elastic blade respectively, on the other hand, with the elastic blade or the supporting member respectively being connected to the torque output element.

Such damping means give a characteristic gradual curve, without any break of slope. The invention thus makes it possible to reduce the vibrations generated in operation and provides a high quality of filtration.

Besides, such a hydrokinetic torque coupling device is easy to mount and rather inexpensive.

It should be noted that the words "radial" and "axial" are defined with respect to the hydrokinetic torque coupling device, which is the axis of rotation of the impeller wheel or of the turbine wheel.

It should be noted that a hydrokinetic torque coupling device may be a torque converter when the hydrokinetic torque coupling means comprise an impeller wheel, a turbine wheel and a reactor, or may be a hydrokinetic coupling device when the hydrokinetic torque coupling means have no reactor.

The impeller wheel is adapted to hydrokinetically drive the turbine wheel, through a reactor.

Using a single flange additionally makes it possible to reduce the weight and the manufacturing and mounting costs of the hydrokinetic torque coupling device.

The torque output element may comprise a central hub, with the turbine wheel being so mounted as to pivot about said central hub, for instance through a rolling bearing.

In this case, the hydrokinetic torque coupling device may comprise a turbine hub rotationally coupled to the turbine wheel, with said turbine hub being mounted to pivot about the central hub through a rolling bearing, such as a ball bearing, for instance.

Besides, the clutch means comprise at least one piston rotationally coupled to the flange, with the piston being able to move relative to the flange, between an engaged position wherein it is rotationally coupled to the torque input element and a disengaged position wherein it is rotationally uncoupled from the torque input element.

In this case, the flange may be rotationally coupled to the piston through at least one protruding part connected to the flange, respectively to the piston, cooperating, in a form-fitting manner, with at least one recessed part connected to the piston, respectively to the flange, with the protruding and the recessed parts enabling an axial motion of the piston relative to the flange while ensuring the rotational coupling of the piston and the flange.

The radially external periphery of the flange may then comprise a cylindrical rim which axially extends toward the piston, with said rim comprising said protruding or recessed part cooperating with the recessed or protruding part of the piston so as to rotationally couple the piston and the flange.

In one embodiment, the supporting member may be mounted on the flange and then be totally radially positioned inside the cylindrical rim of the flange.

According to another embodiment, the cylindrical rim of the flange comprises at least one opening or one recession gone through or at least partially accommodating the supporting member.

The radial overall dimensions of the hydrokinetic torque coupling device can thus be reduced.

Besides, the piston may comprise at least one axially flexible lug, fixed to the piston by a fastening member supporting the supporting member.

The elastic blade, respectively the supporting member, may be connected to the torque output element through a linking member.

The torque output element may further comprise a central hub, with said central hub comprising a rim radially extending outwards, with the motion of the piston in the engaged position, being limited by the resting of the radially internal periphery of the piston on said rim.

In this case, the linking member may be fixed to said rim of the central hub, for instance by welding.

Besides, the hydrokinetic torque coupling device may comprise a reactor, with the impeller wheel being adapted to hydrokinetically drive the turbine wheel through the reactor. The hydrokinetic torque coupling device thus forms a torque converter.

The hydrokinetic torque coupling device may also comprise one or more of the following characteristics:
- the supporting member comprises at least one rolling body, such as a roller so mounted as to pivot about an axis, for instance through a rolling bearing, such as a needle bearing, for instance.
- the supporting member is mounted on the radially external periphery of the flange,
- the impeller wheel is rotationally coupled to a cover wherein the impeller wheel, the turbine wheel and/or the damping means are at least partially accommodated.
- the torque input element comprises said cover,
- the elastic blade is so designed that, in the engaged position, in a relative angular position between the torque input element and the torque output element different from a rest position, the supporting member exerts a bending stress on the elastic blade causing a cross reaction force of the elastic blade on the supporting member, with such reaction force having a circumferential component which tends to move back the torque input element and the torque output element toward said relative rest position.
- the elastic blade is so designed that, in the engaged position, in a relative angular position between the torque input element and the torque output element different from a rest position, the supporting member exerts a bending stress on the elastic blade causing a cross reaction force of the elastic blade on the supporting member, with such reaction force having a radial component which tends to maintain the elastic blade in contact with the supporting member,
- in the engaged position, the angular displacement of the torque input element relative to the torque output element is greater than 20° and preferably greater than 40°.
- the elastic blade comprises a fastening portion and an elastic portion comprising a radially internal strand, a radially external strand and a bowed or bent portion connecting the internal strand and the external strand.
- the damping means comprise at least two elastic leaves, with each elastic blade rotating together with the torque output element, or the torque input element in engaged position respectively, with each blade being associated with a supporting element rotationally linked with the torque input element in engaged position, or the torque output element respectively, with each blade being elastically maintained supported by said matching supporting element, with each elastic blade being adapted to bend upon rotation of the torque input element relative to the torque output element in engaged position.

BRIEF DESCRIPTION OF THE DRAWINGS

The invention will be better understood, and other details, characteristics and advantages of the invention will appear upon reading the following description given by way of a non restrictive example while referring to the appended drawings wherein.

DETAILED DESCRIPTION OF THE PREFERRED EMBODIMENT(S)

Figure 2:
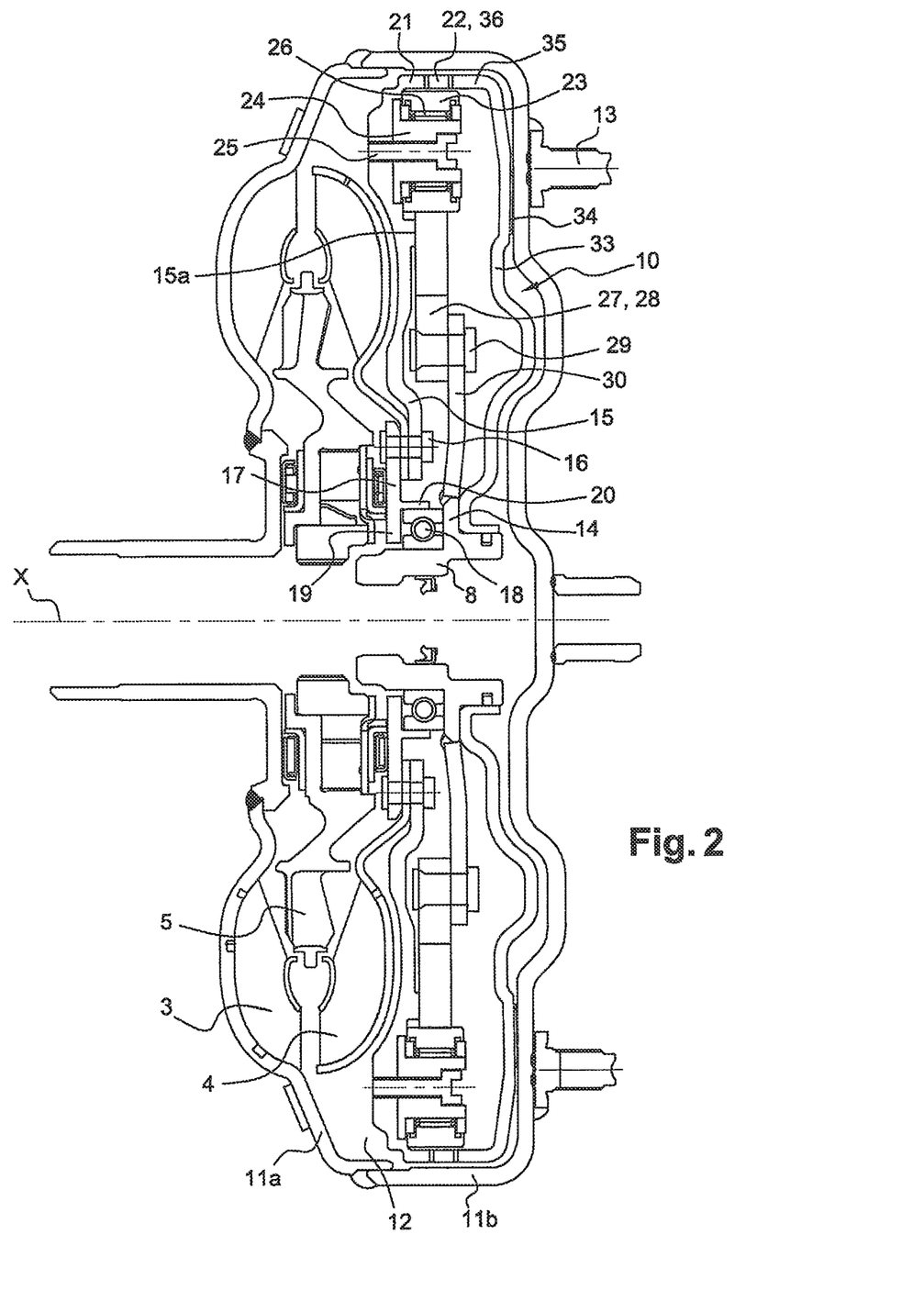
FIG. 2 is a sectional view along an axial plane, of a torque converter according to a first embodiment of the invention.
Figure 3:
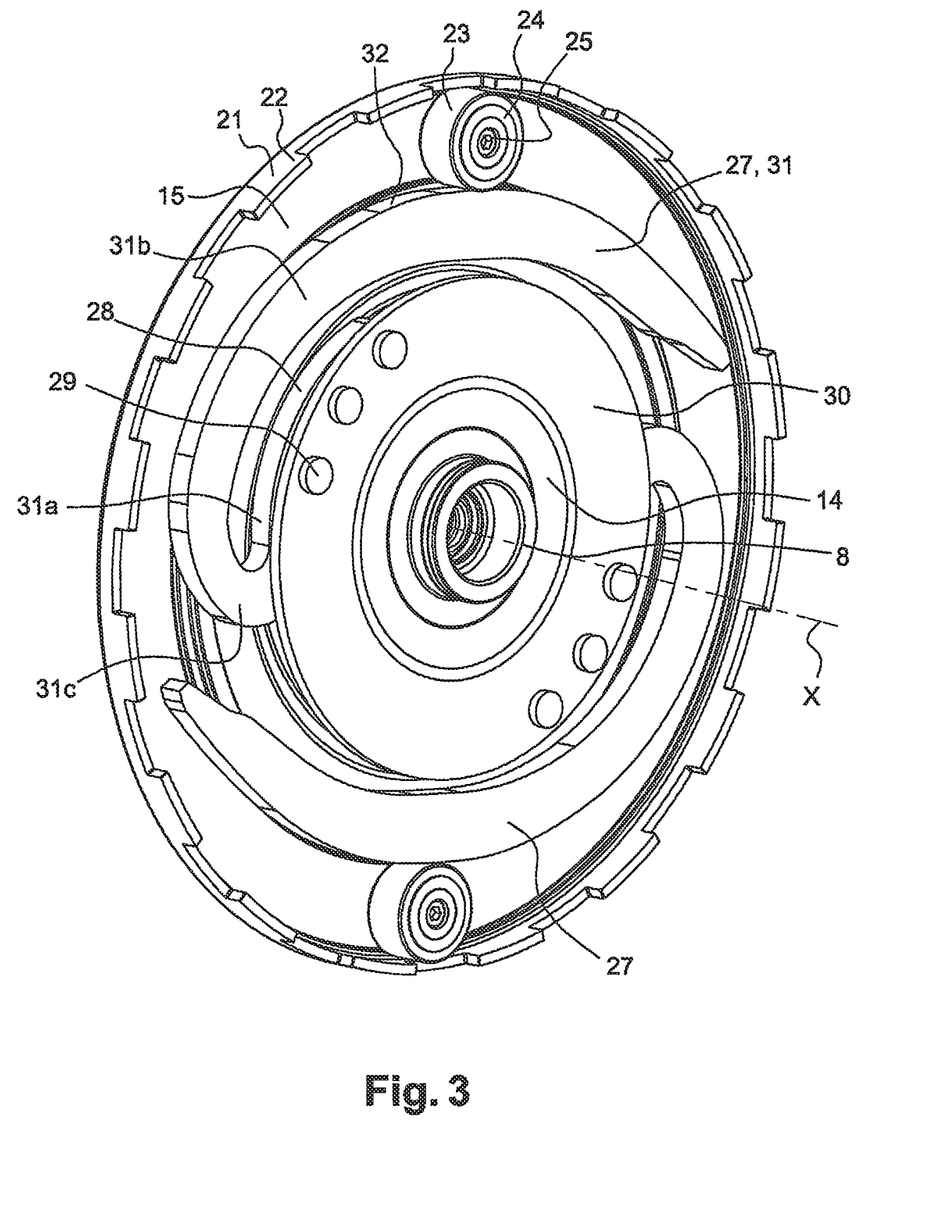
FIG. 3 is a perspective view of a part of the torque converter of FIG. 2.
Figure 4:
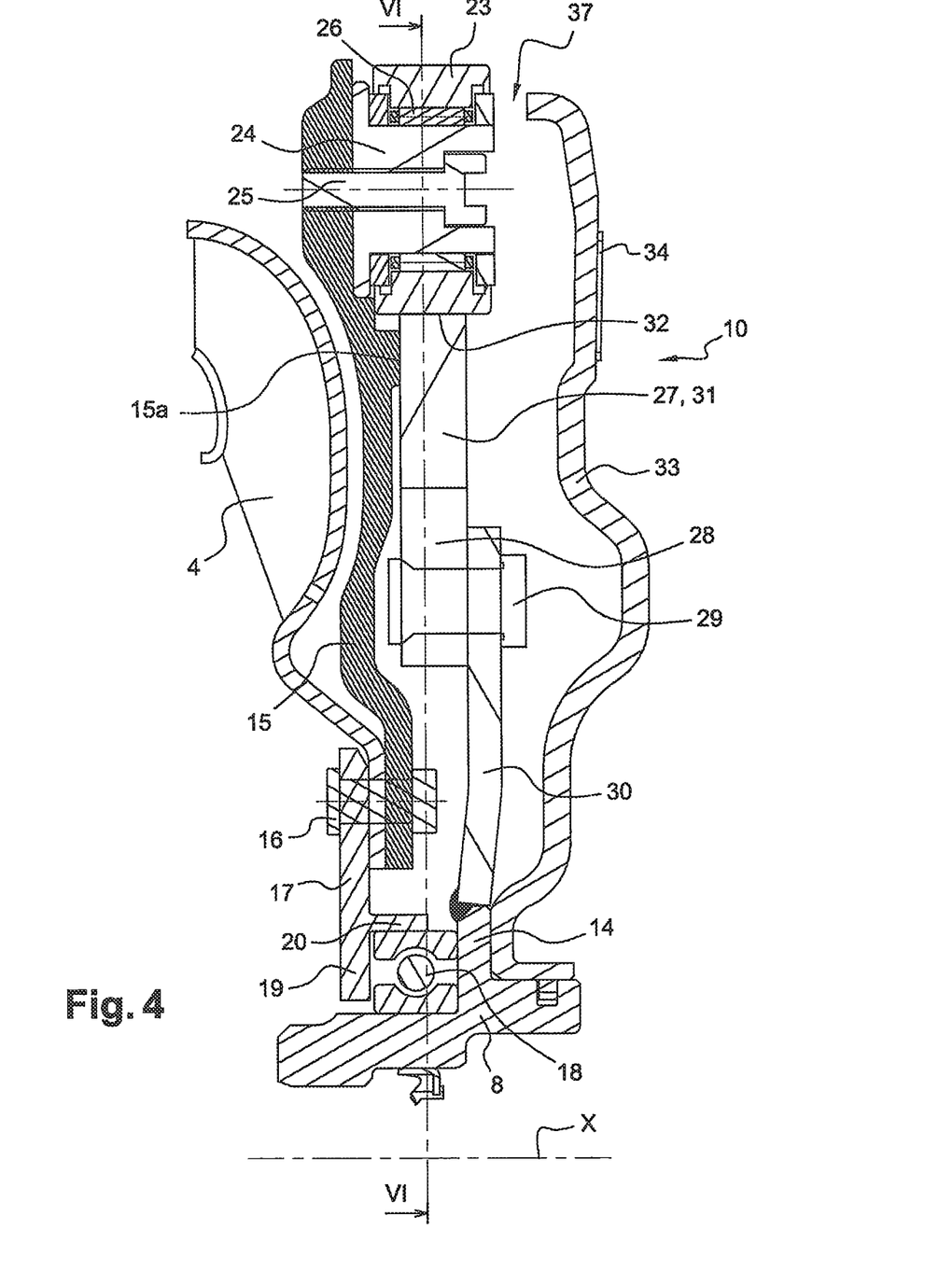
FIG. 4 is a half-view along an axial plane, of a torque converter according to a second embodiment of the invention.
Figure 5:
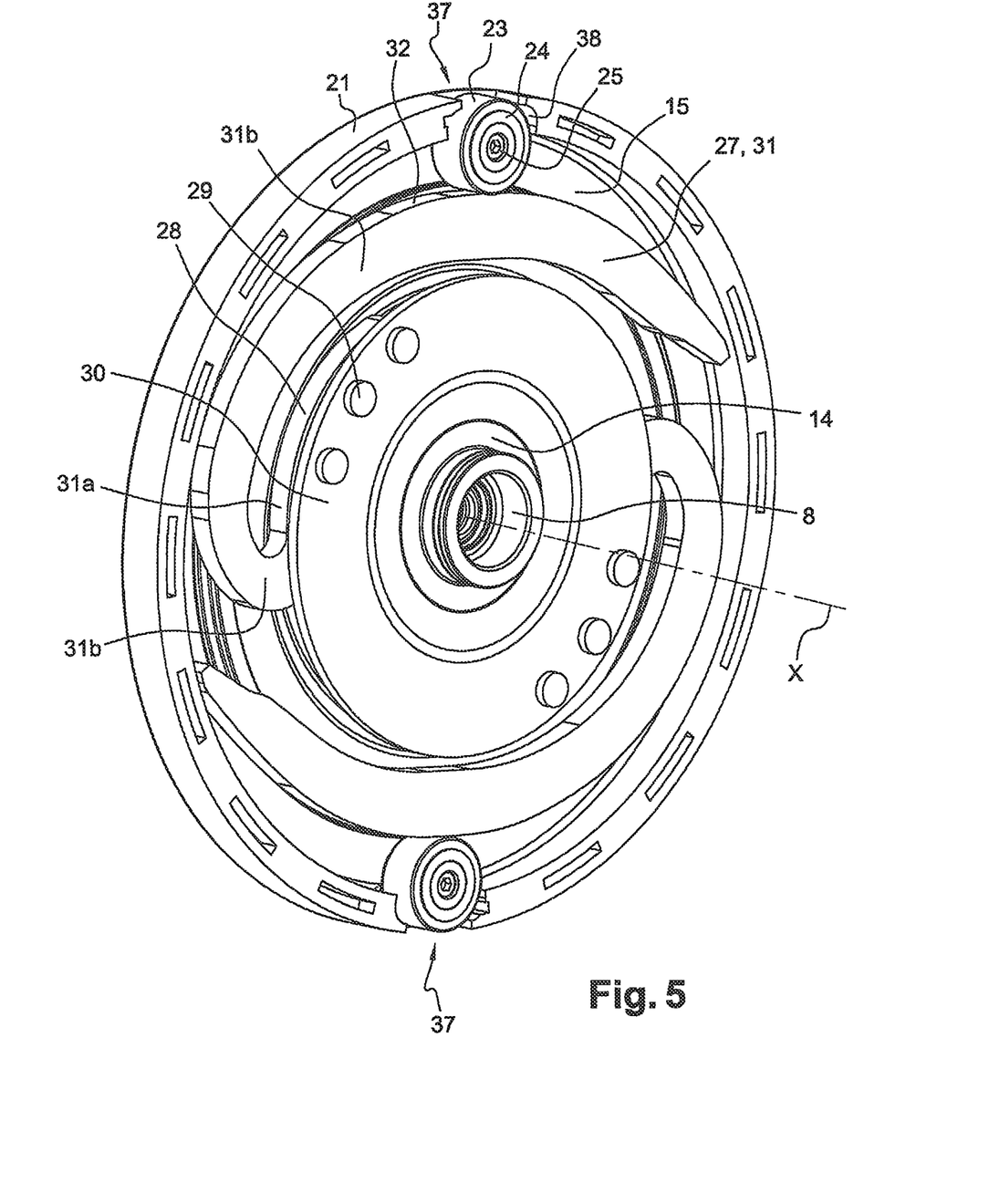
FIG. 5 is a perspective view of a part of the torque converter of FIG. 4.
Figure 6:
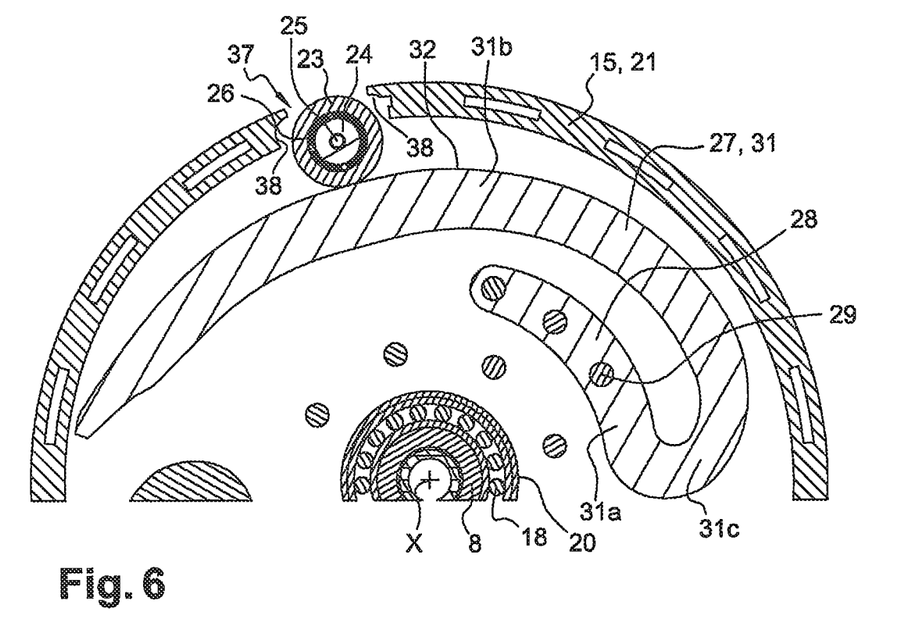
FIG. 6 is a sectional view along the line VI-VI in FIG. 4.
Figure 7:
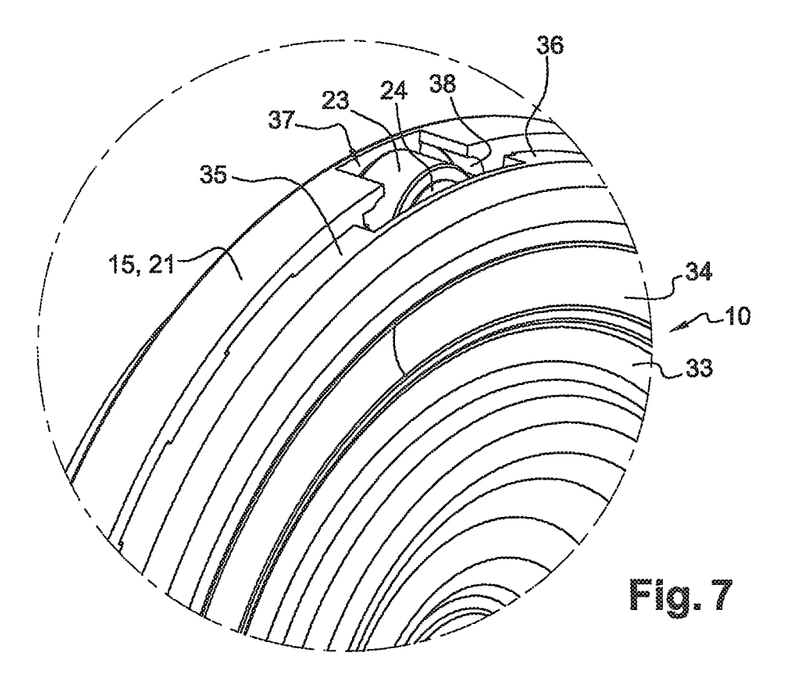
FIG. 7 is a perspective view of a detail illustrating the position of a supporting member in one opening of the flange rim.

The hydrokinetic torque coupling device according to a first embodiment of the invention is shown in FIGS. 2 and 3.

The hydrokinetic torque coupling device is more particularly a hydrodynamic torque converter.

Such device makes it possible to transmit a torque from the output shaft of an internal combustion engine in a motor vehicle, such as for instance a crankshaft 1, to a transmission input shaft 2. The axis of the torque converter bears reference X.

In the following, the words "axial" and "radial" are defined relative to the X axis.

The torque converter conventionally comprises an impeller wheel 3, able to hydrokinetically drive a turbine bladed wheel 4 through a reactor 5.

The impeller wheel 3 is fastened to a cover consisting of two belt-shaped parts 11a, 11b assembled together by welding and defining an internal volume 12 accommodating the impeller wheel 3, the turbine wheel 4 and the reactor 5. Said cover 11a, 11B, also more generally referred to as cover 11, comprises fastening means 13 making it possible to rotationally couple said cover 11 with the crankshaft 1.

The torque converter further comprises a central hub 8, the radially internal periphery of which is ribbed, with an X axis and accommodated in the internal volume 12 of the cover 11. The central hub 8 comprises an annular rim 14 which radially extends outwards.

The turbine wheel 4 is fastened to the radially internal periphery of an annular flange 15, for instance by rivets 16 or by welding. The flange 15 radially extends and is mounted in said internal volume 12. Besides, a turbine hub 17 is fastened to the turbine wheel 4 and to the flange 15 by rivets 16, with said turbine hub 17 being mounted to pivot about the central hub 8 through a rolling bearing, here a ball bearing 18.

The ball bearing 18 is axially mounted between a radial part 19 of the turbine hub 17 and the radial rim 14 of the central hub 8. Besides, the turbine hub 17 comprises a cylindrical rim 20 surrounding the radially external ring of the ball bearing 18.

The radially external periphery of the flange 15 comprises a cylindrical rim 21 which axially extends forwards, opposite the turbine wheel 4. The free end of the rim 21 comprises teeth 22 forming alternately protruding and recessed parts, the function of which will be described hereafter.

Two supporting members or rolling bodies 23 shaped as rollers or cylindrical rollers, are fixed on the radially external periphery of the flange 15. The rolling bodies 23 are positioned so as to be diametrically opposed. The rolling bodies 23 are more specifically mounted about axes or shafts 24 which axially extend forwards from the flange 15, with said shafts 24 being mounted on the flange 15 using bolts, screws 25 or rivets, for instance. The rolling bodies 23 are mounted on the shafts 24 through rolling bearings, such as needle bearings 26, for instance.

In this embodiment, the rim 21 of the flange 15 is preferably continuous on the whole circumference and the rolling bodies 23 are totally radially positioned inside said rim 21.

The torque converter comprises more than two elastic leaves 27. As can be best seen in FIG. 3, each elastic blade 27 comprises a fastening portion 28 riveted 29 to a radial linking member 30 which is itself fixed to the free end of the rim 14 of the hub 8, for instance by welding. Each blade 27 also comprises an elastic portion 31, which comprises a radially internal strand 31a, a radially external strand 31b and a bowed or bent portion 31c connecting the radially internal strand 31a and the radially external strand 31b. The bowed or bent portion 31b has an angle of approximately 180°. In other words, the elastically deformable portion 31 of the elastic blade 27 has two regions radially shifted relative to each other and separated by a radial space. Such a blade 27 is for example known from document FR 3 008 152 in the name of the Applicant.

The external strand 31b develops on the circumference with an angle ranging from 120° to 180°. The radially external strand 31b comprises a radially external surface 32 which forms a raceway supported by the corresponding rolling body 23, with said rolling body 23 being positioned radially outside the external strand 31b of the elastic blade 27. The raceway 32 has a globally convex shape. The raceway 32 may directly consist of a zone of the external strand 31b or of a part which is added onto said external strand 31b.

Each external strand 31b is adapted to be axially supported by a radial surface 15a of the flange 15.

Between each elastic blade 27 and the matching rolling body 31, the transmitted torque is broken down into radial stresses and peripheral stresses. Radial stresses make it possible for the matching blade 27 to bend and peripheral stresses make it possible for the matching rolling body 23 to move on the raceway 32 of the blade 27 and to transmit the torque.

The torque converter further comprises clutch means 10 adapted to rotationally couple the cover 11 and the flange 15 in the engaged position, and adapted to release the cover 11 from the flange 15 in a disengaged position.

The clutch means 10 comprise an annular piston 33 which extends radially and is accommodated in the inner space 12 of the cover 10, the radially external periphery of which comprises a resting area equipped with clutch lining 34 and adapted to rest on the part 11b of the cover 11 in an engaged position, so as to provide a rotational coupling of the cover 11 and the piston 33.

The radially external periphery of the piston 33 further comprises a rim 35 provided with teeth 36 which define alternating recessed and protruding zones, engaged with the teeth 22 of the flange 15 so as to provide a rotational coupling of the flange 15 and of the piston 33 while enabling the axial motion of the piston 33 relative to said flange 15 between the engaged and disengaged positions thereof. The motion of the piston 33 is controlled by pressure chambers positioned on either side of the piston 33. Besides, the motion of the piston 33 in the disengaged position may be limited by the radially internal periphery of the piston 33 resting on the annular rim 14 of the central hub 8.

Such clutch means 10 make it possible to transmit a torque from the crankshaft 1 to the transmission input shaft 2, in a determined operation phase, without any action by the hydrokinetic coupling means consisting of the impeller wheel 3, the turbine wheel 4 and the reactor 5.

In operation, the torque from the crankshaft 1 is transmitted to the cover 11 through the fastening means 13. In the disengaged position of the piston 33, the torque goes through the hydrokinetic coupling means, i.e. the impeller wheel 3 and then the turbine wheel 4 fixed to the flange. The torque is then transmitted to the linking member 30, then to the hub 8 through the damping means formed by the supporting members 23 and the elastic leaves 27. The torque is then transmitted to the transmission input shaft 2 coupled to the hub 8 through the internal ribs of said hub 8.

In the engaged position of the piston 33, the torque from the cover 11 is transmitted to the flange 15 through the piston 33, then to the hub 8 through the damping means formed by the elastic leaves 27 and by the supporting members 23 and through the linking member 30. The torque is then transmitted to the transmission input shaft 2 coupled to the hub 8 through the internal ribs of said hub 8.

When the torque transmitted through the damping means 23, 27 varies, the radial stresses exerted between each elastic blade 27 and the matching rolling body 23 vary and the bending of the elastic blade 27 is modified. The modification in the bending of the blade 27 comes with a motion of the rolling body 23 along the matching raceway 32 due to peripheral stresses.

The raceways 32 have profiles so arranged that, when the transmitted torque increases, the rolling bodies 23 each exert a bending stress on the matching elastic blade 27 which causes the free distal end of the elastic blade 27 to move towards the X axis and a relative rotation between the flange 15 and the hub 8 such that the later move away from their relative rest position. Rest position means the relative position of the flange 15 relative to the hub 8, wherein no torque is transmitted between the latter.

The profiles of the raceways 32 are thus such that the rolling bodies 23 exert bending stresses having radial components and circumferential components onto the elastic leaves 27.

The elastic leaves 27 exert, onto the rolling bodies 23, a backmoving force having a circumferential component which tends to rotate the rolling bodies 23 in a reverse direction of rotation and thus to move back the flange 15 and the hub 8 towards their relative rest position, and a radial component directed outwards which tends to maintain the raceway 32 supported by the matching rolling body 23.

When the flange 15 and the hub 8 are in their rest position, the elastic leaves 27 are preferably radially pre-stressed toward the X axis so as to exert a reaction force directed radially outwards, so as to maintain the leaves 27 supported by the rolling bodies 23.

The profiles of the raceways 32 may equally be so arranged that the characteristic transmission curve of the torque according to the angular displacement is symmetrical or not relative to the rest position. According to an advantageous embodiment, the angular displacement may be more important in a so-called direct direction of rotation than in an opposite, so-called reverse direction of rotation.

The angular displacement of the cover 11 relative to the hub 8 may be greater than 20°, preferably greater than 40°.

The elastic leaves 27 are regularly distributed around the X axis and are symmetrical relative to the X axis so as to ensure the balance of the torque converter.

The torque converter may also comprise friction means so arranged as to exert a resisting torque between the flange 15 and the hub 8 during the relative displacement thereof so as to dissipate the energy stored in the elastic leaves 27.

FIGS. 4 to 7 show a second embodiment of the invention, which is different from the one shown in FIGS. 2 and 3 in that the rim 21 of the flange 15 comprises two openings 37 facing the rolling bodies 23, with each opening accommodating, or being gone through by one of the supporting members 23. The radially external periphery of the rolling bodies 23 may or not extend radially outside the rim 21.

Each opening 37 is delimited by two concave side surfaces 38 having a general cylindrical shape, with the axis of said surfaces 38 being parallel to the X axis of the torque converter, so as to form spaces adapted to the cylindrical shape of the rolling bodies 23.

Such embodiment makes it possible to reduce the radial overall dimensions of the torque converter.

Figure 8:
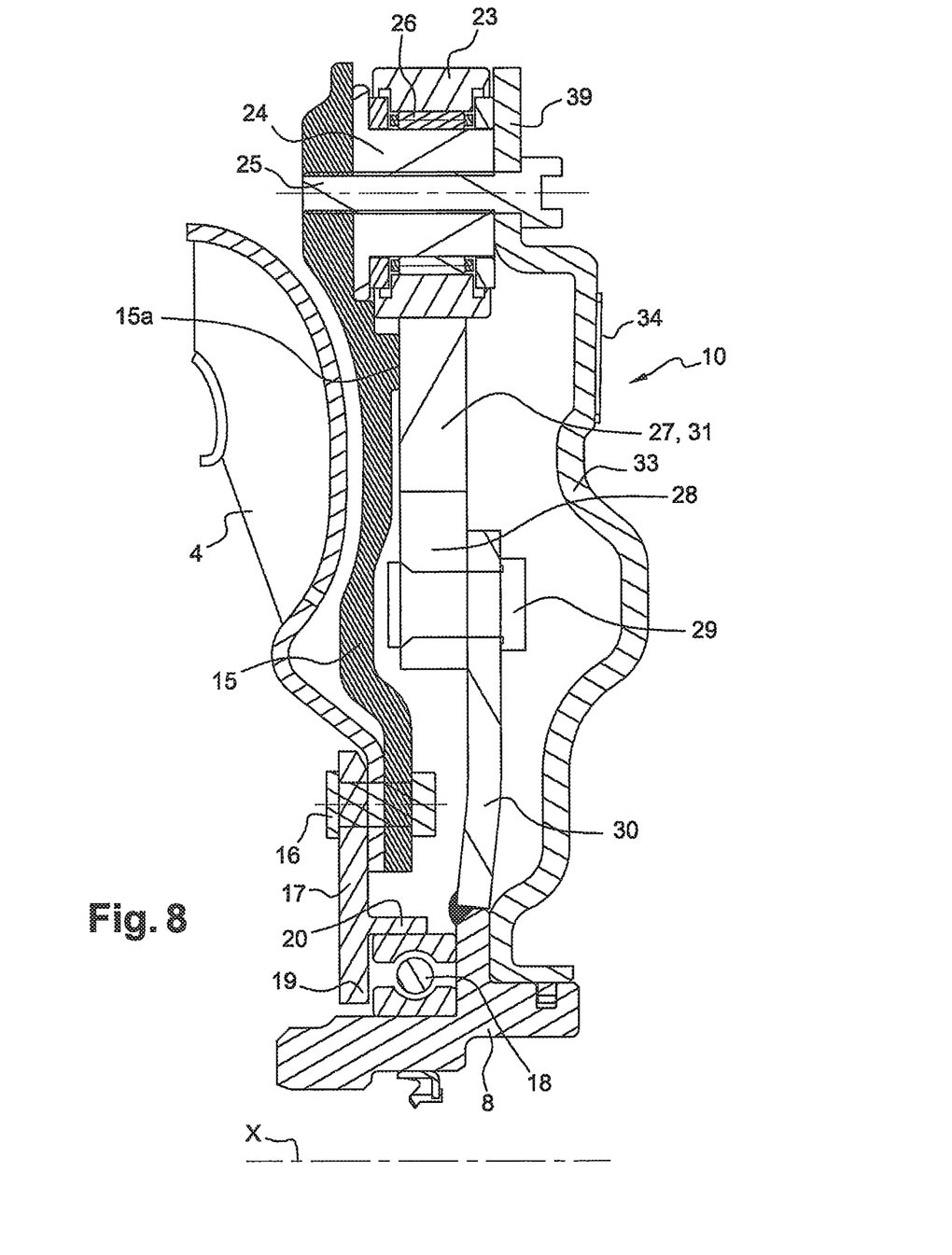
FIG. 8 is a half-view along an axial plane, of a torque converter according to a third embodiment of the invention.
Figure 9:
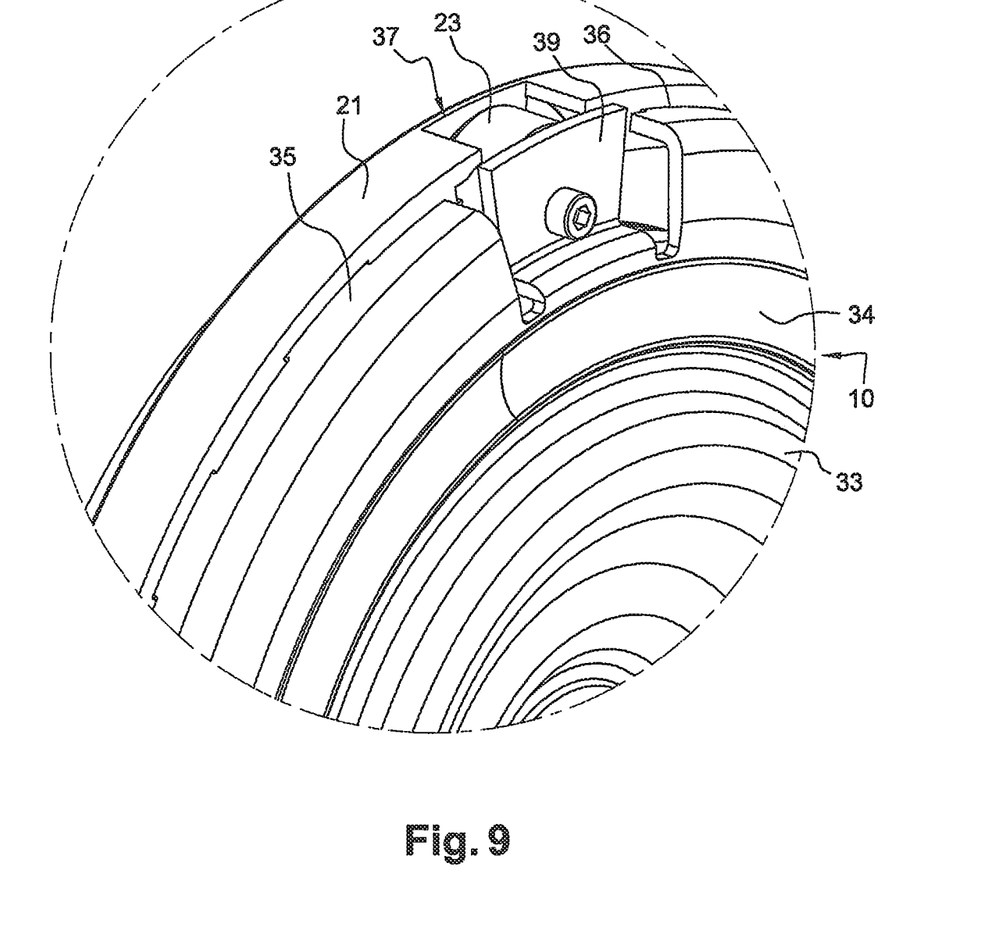
FIG. 9 is a detailed perspective view showing the fastening of the piston and the flange of the torque converter of FIG. 8.

FIGS. 8 and 9 illustrate a torque converter according to a third embodiment, which is different from the one referred to in FIGS. 4 to 7 in that the piston 33 has lugs 39 on its radially external periphery, with said lugs 39 being so folded as to axially extend backwards relative to the zone carrying the clutch lining 34. In the embodiment illustrated in FIGS. 8 and 9, the piston 33 has two diametrically opposed lugs 39. The lugs 39 are fixed to the flange 15 by means of screws 23 or bolts used for mounting the shafts 24 which carry the rolling bodies 23. The rigidity of the lugs 39 is so adapted that they remain flexible enough to enable an axial motion of the piston 33.

The invention claimed is:

1. A hydrokinetic torque coupling device for a motor vehicle, comprising:
    a torque input element (11) intended to be coupled to a crankshaft (1),
    a turbine wheel (4),
    an impeller wheel (3) rotationally coupled to the torque input element (11) and able to hydrokinetically drive the turbine wheel (4),
    a torque output element (8) intended to be coupled to a transmission input shaft (2),
    damping means (23, 27),
    clutch means (10) movable between an engaged position wherein the torque input element (11) and the torque output element (8) are rotationally coupled through the damping means (23, 27), and a disengaged position wherein the torque input element (11) and the torque output element (8) are rotationally coupled through the impeller wheel (3), the turbine wheel and the damping means (23, 27),
    the damping means (23, 27) adapted to act against the rotation of the torque input element (11) relative to the torque output element (8), the damping means (23, 27) comprising an elastic blade (27) elastically supported by a supporting member (23), the elastic blade (27) being able to bend upon rotation of the torque input element (11) relative to the torque output element (8) in the engaged position, the elastic blade transmitting torque through the damping means,
    the hydrokinetic torque coupling device further comprising a single flange (15) connecting the turbine wheel (4) and the supporting member (23), the elastic blade being connected to the torque output element (8).

2. The hydrokinetic torque coupling device according to claim 1, wherein the torque output element comprises a central hub (8), and wherein the turbine wheel (4) is mounted to pivot about the central hub (8).

3. The hydrokinetic torque coupling device according to claim 2, further comprising a turbine hub (17) rotationally coupled to the turbine wheel (4), wherein the turbine hub (17) is mounted to pivot about the central hub (8) through a rolling bearing.

4. The hydrokinetic torque coupling device according to claim 3, wherein the clutch means (10) comprise at least one piston (33) rotationally coupled to the flange (15), and wherein the piston (33) is moveable relative to the flange (10) between the engaged position wherein the piston (33) is rotationally coupled to the torque input element (11) and the disengaged position wherein the piston (33) is rotationally uncoupled from the torque input element (11).

5. The hydrokinetic torque coupling device according to claim 3, wherein the piston (33) comprises at least one axially flexible lug (39) fastened to the piston (33) through a fastening member (25) supporting the supporting member (23).

6. The hydrokinetic torque coupling device according to claim 2, wherein the clutch means (10) comprise at least one piston (33) rotationally coupled to the flange (15), and wherein the piston (33) is moveable relative to the flange (10) between the engaged position wherein the piston (33) is rotationally coupled to the torque input element (11) and the disengaged position wherein the piston (33) is rotationally uncoupled from the torque input element (11).

7. The hydrokinetic torque coupling device according to claim 2, wherein the piston (33) comprises at least one axially flexible lug (39) fastened to the piston (33) through a fastening member (25) supporting the supporting member (23).

8. The hydrokinetic torque coupling device according to claim 1, further comprising a reactor (5), with the impeller wheel (3) being able to hydrokinetically drive the turbine wheel (4) through the reactor (5).

9. A hydrokinetic torque coupling device for a motor vehicle, comprising:
   a torque input element (11) intended to be coupled to a crankshaft (1);
   a turbine wheel (4);
   an impeller wheel (3) rotationally coupled to the torque input element (11) and able to hydrokinetically drive the turbine wheel (4);
   a torque output element (8) intended to be coupled to a transmission input shaft (2);
   damping means (23, 27);
   clutch means (10) movable between an engaged position wherein the torque input element (11) and the torque output element (8) are rotationally coupled through the damping means (23, 27), and a disengaged position wherein the torque input element (11) and the torque output element (8) are rotationally coupled through the impeller wheel (3), the turbine wheel and the damping means (23, 27);
   the damping means (23, 27) adapted to act against the rotation of the torque input element (11) relative to the torque output element (8), the damping means (23, 27) comprising an elastic blade (27) elastically supported by a supporting member (23), the elastic blade (27) being able to bend upon rotation of the torque input element (11) relative to the torque output element (8) in the engaged position, the elastic blade transmitting torque through the damping means;
   the hydrokinetic torque coupling device further comprising a single flange (15) connecting the turbine wheel (4) and the supporting member (23), the elastic blade being connected to the torque output element (8);
   the clutch means (10) comprising at least one piston (33) rotationally coupled to the flange (15), the piston (33) moveable relative to the flange (15) between the engaged position wherein the piston is rotationally coupled to the torque input element (11) and the disengaged position wherein the piston is rotationally uncoupled from the torque input element (11).

10. The hydrokinetic torque coupling device according to claim 9, wherein the flange (15) is rotationally coupled to the piston (33) through at least one protruding part (22) connected to the flange (15), respectively to the piston (33), cooperating, in a form-fitting manner, with at least one recessed part connected to the piston (33), respectively to the flange (15), with the protruding and the recessed parts (22) enabling an axial motion of the piston (33) relative to the flange (15) while ensuring the rotational coupling of the piston (33) and the flange (15).

11. The hydrokinetic torque coupling device according to claim 10, wherein the radially external periphery of the flange (15) comprises a cylindrical rim (21) which axially extends toward the piston, and wherein the rim (21) comprises the protruding or recessed part (22) cooperating with the recessed or protruding part (36) of the piston (33) so as to rotationally couple the piston (33) and the flange (15).

12. The hydrokinetic torque coupling device according to claim 11, wherein the supporting member (23) is mounted on the flange (15) and is totally radially positioned inside the cylindrical rim (21) of the flange (15).

13. The hydrokinetic torque coupling device according to claim 11, wherein the cylindrical rim (21) of the flange (15) comprises at least one opening (37) or one recession gone through or at least partially accommodating the supporting member (23).

14. The hydrokinetic torque coupling device according to claim 11, wherein the piston (33) comprises at least one axially flexible lug (39) fastened to the piston (33) through a fastening member (25) supporting the supporting member (23).

15. The hydrokinetic torque coupling device according to claim 10, wherein the piston (33) comprises at least one axially flexible lug (39) fastened to the piston (33) through a fastening member (25) supporting the supporting member (23).

16. The hydrokinetic torque coupling device according to claim 9, wherein the piston (33) comprises at least one axially flexible lug (39), fastened to the piston (33) through a fastening member (25) supporting the supporting member (23).

17. The hydrokinetic torque coupling device according to claim 9, wherein the torque output element comprises a central hub (8), with the central hub (8) comprising a rim (14) which radially extends outwards, with the motion of the piston (33) in the engaged position, being limited by the resting of the radially internal periphery of the piston (33) on the rim (14) of the central hub (8).

18. The hydrokinetic torque coupling device according to claim 9, wherein the piston (33) comprises at least one axially flexible lug (39) fastened to the piston (33) through a fastening member (25) supporting the supporting member (23).

19. A hydrokinetic torque coupling device for a motor vehicle, comprising:
   a torque input element (11) intended to be coupled to a crankshaft (1);
   a turbine wheel (4);
   an impeller wheel (3) rotationally coupled to the torque input element (11) and able to hydrokinetically drive the turbine wheel (4);
   a torque output element (8) intended to be coupled to a transmission input shaft (2);
   damping means (23, 27);
   clutch means (10) movable between an engaged position wherein the torque input element (11) and the torque output element (8) are rotationally coupled through the damping means (23, 27), and a disengaged position wherein the torque input element (11) and the torque output element (8) are rotationally coupled through the impeller wheel (3), the turbine wheel and the damping means (23, 27);
   the damping means (23, 27) adapted to act against the rotation of the torque input element (11) relative to the torque output element (8), the damping means (23, 27) comprising an elastic blade (27) elastically supported by a supporting member (23), the elastic blade (27) being able to bend upon rotation of the torque input element (11) relative to the torque output element (8) in the engaged position, the elastic blade transmitting torque through the damping means;

the hydrokinetic torque coupling device further comprising a single flange (15) connecting the turbine wheel (4) and the supporting member (23), the elastic blade being connected to the torque output element (8);

the elastic blade (27) connected to the torque output element (8) through a linking member (30).

20. The hydrokinetic torque coupling device according to claim 19, wherein the linking member (30) is fixed to the rim of the central hub (8).

21. A hydrokinetic torque coupling device for a motor vehicle, comprising
   a torque input element (11) intended to be coupled to a crankshaft (1),
   a turbine wheel (4),
   an impeller wheel (3) rotationally coupled to the torque input element (11) and able to hydrokinetically drive the turbine wheel (4),
   a torque output element (8) intended to be coupled to a transmission input shaft (2),
   damping means (23, 27),
   clutch means (10) movable between an engaged position wherein the torque input element (11) and the torque output element (8) which are rotationally coupled through damping means (23, 27), and a disengaged position wherein the torque input element (11) and the torque output element (8) are rotationally coupled through the impeller wheel (3), the turbine wheel and the damping means (23, 27), with the damping means (23, 27), being adapted to act against the rotation of the torque input element (11) relative to the torque output element (8), with the damping means (23, 27) comprising an elastic blade (27) elastically supported by a supporting member (23), with the elastic blade (27) being able to bend upon rotation of the torque input element (11) relative to the torque output element (8) in an engaged position, the elastic blade transmitting torque through the damping means, with the hydrokinetic torque coupling device further comprising a single flange (15) connecting the turbine wheel (4) and the elastic blade, the supporting member being connected to the torque output element (8).

\* \* \* \* \*